UNITED STATES PATENT OFFICE.

JOEL A. H. ELLIS, OF SPRINGFIELD, VERMONT.

IMPROVEMENT IN COMPOUND LIQUIDS FOR USE IN VAPOR-ENGINES.

Specification forming part of Letters Patent No. 111,329, dated January 31, 1871.

*To all whom it may concern:*

Be it known that I, JOEL A. H. ELLIS, of Springfield, in the county of Windsor and State of Vermont, have invented a new and useful Compound Liquid for the Generators of Vapor-Engines; and I do hereby declare that the following is a full, clear, and exact description thereof, which will enable others skilled in the art to make and use the same.

This invention relates to a new compound fluid to be used in the vapor-generators of vapor-engines. Its object is to produce a fluid at small cost that will vaporize at a low temperature, and whose vapors can be used in the cylinder of an engine without producing so much friction as to wear the parts rapidly and destroy their usefulness.

The light hydrocarbons produced in the distillation of petroleum could be used for this purpose to advantage but for the fact that their vapors absorb and carry away from the piston and cylinder of the engine all ordinary lubricators, leaving them dry, and causing a great amount of friction and a rapid wear.

I have discovered that by adding a small proportion of the bisulphide of carbon to hydrocarbon a mixture is produced which does not separate by evaporation, and that the vapors of the bisulphide of carbon act to lubricate the parts and obviate the difficulties met with when the hydrocarbon is used alone.

I mix the hydrocarbon with the bisulphide of carbon in the proportion of about fifteen per cent. of the latter to eighty-five per cent. of the former; but the proportions may be varied, if desired, for any particular character of generator or vapor-engine, as I do not confine myself to the use of my compound liquid in any particular engine or generator.

Having thus described my invention, I claim as new and desire to secure by Letters Patent—

The compound liquid herein specified for the generator of a vapor-engine.

JOEL A. H. ELLIS.

Witnesses:
T. B. MOSHER,
GEO. W. MABEE.